United States Patent
Yokoi

(10) Patent No.: US 12,247,963 B2
(45) Date of Patent: Mar. 11, 2025

(54) ANALYSIS SYSTEM

(71) Applicant: SHIMADZU CORPORATION, Kyoto (JP)

(72) Inventor: Yusuke Yokoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 381 days.

(21) Appl. No.: 17/436,322

(22) PCT Filed: Mar. 11, 2019

(86) PCT No.: PCT/JP2019/009715
§ 371 (c)(1),
(2) Date: Sep. 3, 2021

(87) PCT Pub. No.: WO2020/183573
PCT Pub. Date: Sep. 17, 2020

(65) Prior Publication Data
US 2022/0178889 A1    Jun. 9, 2022

(51) Int. Cl.
*G01N 30/74* (2006.01)
*G01N 30/30* (2006.01)
(Continued)

(52) U.S. Cl.
CPC ............. *G01N 30/74* (2013.01); *G01N 30/30* (2013.01); *G01N 30/32* (2013.01);
(Continued)

(58) Field of Classification Search
CPC ........ G01N 30/74; G01N 30/30; G01N 30/32; G01N 30/8624; G01N 30/88;
(Continued)

(56) References Cited

U.S. PATENT DOCUMENTS

| | | | | |
|---|---|---|---|---|
| 5,965,819 A | * | 10/1999 | Piety | G01H 1/003 702/56 |
| 2014/0157875 A1 | * | 6/2014 | Yamamoto | G01N 30/86 73/53.01 |
| 2019/0004074 A1 | | 1/2019 | Yoshida | |

FOREIGN PATENT DOCUMENTS

| JP | 2005-221232 A | 8/2005 |
|---|---|---|
| JP | 2009-270940 A | 11/2009 |

(Continued)

OTHER PUBLICATIONS

International Search Report for corresponding Application No. PCT/JP2019/009715, mailed Jun. 4, 2019.
Written Opinion for corresponding Application No. PCT/JP2019/009715, mailed Jun. 4, 2019.
Chinese Office Action for corresponding Chinese Application No. 201980093508.1 mailed Feb. 28, 2023, with Machine Translation.
Japanese Office Action for corresponding Japanese Application No. 2021-504647 mailed Jul. 5, 2022.
(Continued)

*Primary Examiner* — Tarun Sinha
(74) *Attorney, Agent, or Firm* — Renner, Otto, Boisselle & Sklar, LLP

(57) ABSTRACT

An analysis system includes a setting device, an execution device, a determination device, and a notification device, and analyzes a sample by combining functions of a plurality of units. The setting device sets an analysis condition for each of the plurality of units. The execution device can execute the function of each of the plurality of units prior to the analysis of the sample. The determination device determines whether preparation for starting the analysis is completed for each of the plurality of units based on a comparison between a state of the unit and the analysis condition corresponding to the unit. The notification device notifies an analyst of a determination result by the determination device.

12 Claims, 9 Drawing Sheets

(51) Int. Cl.
*G01N 30/32* (2006.01)
*G01N 30/86* (2006.01)
*G01N 30/88* (2006.01)
*G01N 30/02* (2006.01)

(52) U.S. Cl.
CPC ......... *G01N 30/8624* (2013.01); *G01N 30/88* (2013.01); *G01N 2030/027* (2013.01); *G01N 2030/3084* (2013.01); *G01N 2030/326* (2013.01); *G01N 2030/8804* (2013.01)

(58) Field of Classification Search
CPC ..... G01N 2030/027; G01N 2030/3084; G01N 2030/326; G01N 2030/8804; G01N 35/00; G01N 30/86
See application file for complete search history.

(56) References Cited

FOREIGN PATENT DOCUMENTS

| | | | |
|---|---|---|---|
| JP | 2014235153 A | * | 12/2014 |
| JP | 2018-179895 A | | 11/2018 |

OTHER PUBLICATIONS

Chinese Office Action for corresponding Chinese Application No. 201980093508.1 mailed Jan. 4, 2024, with Machine Translation.

* cited by examiner

FIG.4

| CASE | METHOD FILE USED OR NOT USED | DIRECT BUTTON ON/OFF | UNIT STATUS Ready/Not ready |
|---|---|---|---|
| 1-0 | NOT USED | OFF | – |
| 1-1 | USED | OFF | Not Ready |
| 1-2 | USED | ON | Ready |

COMPARISON 1

FIG.8

| CASE | METHOD FILE USED OR NOT USED | DIRECT BUTTON ON/OFF | METHOD FILE SETTING CONDITION | UNIT MEASUREMENT VALUE | UNIT STATUS Ready/Not ready |
|---|---|---|---|---|---|
| 2-0 | NOT USED | OFF | — | Not A | — |
| 2-1 | USED | OFF | A | Not A | Not Ready |
| 2-2 | USED | ON | A | Not A | Not Ready |
| 2-3 | USED | ON | A | A | Ready |

COMPARISON 1 (between Direct Button and Method File Setting Condition)

COMPARISON 2 (between Method File Setting Condition and Unit Measurement Value)

ANALYSIS SYSTEM

TECHNICAL FIELD

The present invention relates to an analysis system.

BACKGROUND ART

Conventionally, there is known an analysis system in which analysis units having various functions are appropriately combined and used to analyze components contained in a sample. For example, Japanese Patent Laying-Open No. 2005-221232 (PTL 1) discloses an analysis system in which analysis units such as a sample introduction unit, a sample separation unit, and a detector unit are controlled by a computer.

CITATION LIST

Patent Literature

PTL 1: Japanese Patent Laying-Open No. 2005-221232

SUMMARY OF INVENTION

Technical Problem

In such an analysis system, a control computer is used as a control device for remote operation, and is sometimes provided at a place different from a place where each unit is disposed. For this reason, each unit includes a communication unit that wirelessly and/or wiredly receives a control signal from the computer. A configuration in which an analyst executes manual driving of each unit and/or a change of a setting value of a parameter in an individual operation unit (for example, a touch panel) provided in each unit for the purpose of maintenance, operation confirmation, and the like is known in each of such units.

However, in such a configuration, while the unit is preparing for the analysis, sometimes the analyst or a third party operates the individual operation unit to change the analysis condition (an operation state and a setting value) of each unit. In this case, when the changed analysis condition is a condition not intended by the analyst, there is a risk that an appropriate analysis is not executed.

For example, in order to stably execute the analysis in the unit, warm-up operation of the unit is often executed a predetermined time or more before a start of the actual analysis. For such a purpose, while the analyst remotely starts the unit from a computer in advance to execute the warm-up operation, sometimes the analyst temporarily stops and restarts the unit for the purpose of replacement of a component by operation of the individual operation unit of the unit. However, sometimes the analyst erroneously forgets the operation of restarting the unit after the replacement of the component. In such a situation, when the analyst starts the analysis by the remote control from the computer, because the unit in which the warm-up operation is stopped is restarted by an analysis start command, the analysis is started in the state where the preparation for the analysis is insufficient. In that case, there is a risk that the analysis is executed in an unstable state without being noticed by the analyst.

The present invention has been made to solve such a problem, and an object of the present invention is to reduce a possibility that the analysis is executed under the inappropriate analysis condition in the analysis system in which the analyzer including the plurality of units is controlled by the computer.

Solution to Problem

A first aspect of the present invention is an analysis system includes a setting device, an execution device, a determination device, and a notification device, and analyzes a sample by combining functions of a plurality of units. The setting device sets an analysis condition for each of the plurality of units. The execution device can execute the function of each of the plurality of units prior to the analysis of the sample. The determination device determines whether preparation for starting the analysis is completed for each of the plurality of units based on a comparison between a state of the unit and the analysis condition corresponding to the unit. The notification device notifies an analyst of a determination result by the determination device.

Advantageous Effects of Invention

According to the present invention, a possibility that the analysis is executed under an inappropriate analysis condition can be reduced in the analysis system in which the analyzer including the plurality of units is controlled by a computer.

BRIEF DESCRIPTION OF DRAWINGS

FIG. 4 is a table illustrating a unit status determination method of the first embodiment.

FIG. 8 is a table illustrating a unit status determination method of a second embodiment.

DESCRIPTION OF EMBODIMENTS

First Embodiment

Figure 1:
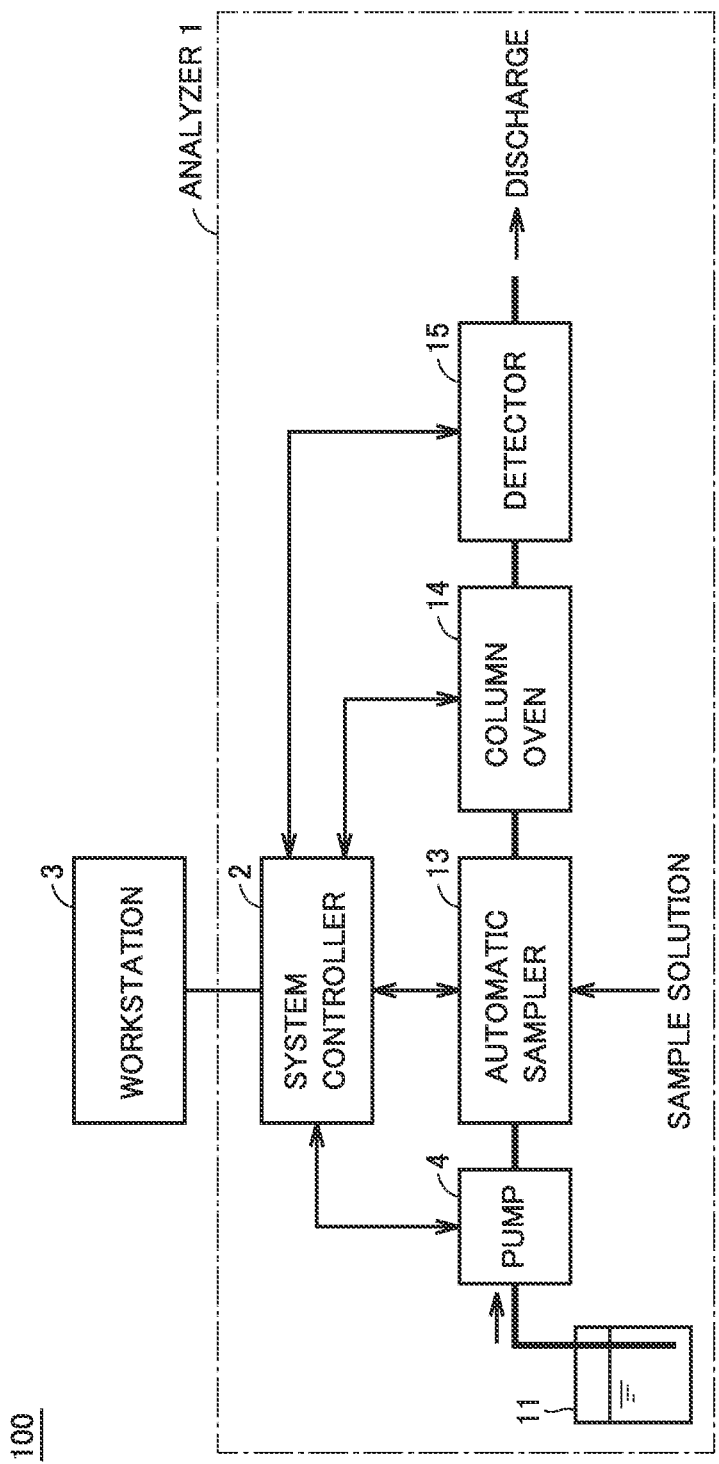
FIG. 1 is a schematic diagram illustrating a configuration example of an analysis system according to a first embodiment.

Hereinafter, embodiments of the present invention will be described in detail with reference to the drawings. In the drawings, the same or corresponding portion is denoted by the same reference numeral, and the description thereof will not be repeated.

An analysis system 100 according to a first embodiment is an analysis system in which a system is constructed by a combination of a plurality of devices (hereinafter, also referred to as a "unit") executing physical or chemical analysis on the sample. For example, analysis system 100 is a liquid chromatograph analysis system.

FIG. 1 is a schematic diagram illustrating a configuration example of analysis system 100 of the first embodiment.

Referring to FIG. 1, analysis system 100 of the first embodiment includes an analyzer 1 and an analysis workstation (hereinafter, also simply referred to as a "workstation") 3.

Analyzer 1 is a liquid chromatograph analyzer, and includes a system controller 2, an eluent tank 11, a pump unit 4, an automatic sampler 13, a column oven 14, and a detector 15. Analyzer 1 executes the analysis on the sample according to analysis conditions (an operation state, a setting value, and the like, described later in detail) set in workstation 3, and acquires data necessary for the analysis of the sample. Workstation 3 executes predetermined analysis (arithmetic processing) on the data acquired by analyzer 1 and integrally manages the acquired data and the analyzed data. In the example of FIG. 1, each of pump unit 4, automatic sampler 13, column oven 14, and detector 15 corresponds to the "unit" described above.

For example, workstation 3 is a general-purpose personal computer, and software (hereinafter, also referred to as "control software") related to control and data processing of analyzer 1 is installed in workstation 3. When the control software is executed in workstation 3, the control of analyzer 1 and the data analysis are executed. Workstation 3 transmits a "method file" (described later) to system controller 2 of analyzer 1. The method file includes information related to the analysis in analyzer 1, such as a signal indicating which unit is used among a plurality of units connected to system controller 2 and a control signal controlling the setting and operation related to the unit to be used. Workstation 3 may be a dedicated data processing device. Workstation 3 corresponds to an embodiment of the "setting device".

In the liquid chromatograph analyzer, various detectors such as a detector, an ultraviolet-visible spectroscopic detector, an electrical conductivity detector, and a refractive index detector are appropriately selected and used according to a purpose of the analysis and the type of the sample.

System controller 2 is connected to workstation 3 and each unit in a wired or wireless manner. System controller 2 receives the method file from workstation 3, and transmits the received method file to each unit. In addition, system controller 2 receives a signal from each unit, executes predetermined arithmetic processing of the signal as necessary, and then transmits the signal to workstation 3.

Eluent tank 11 is a container in which an eluent (mobile phase) is accumulated.

Pump unit 4 is controlled by system controller 2, and is configured to suck the eluent from eluent tank 11 and supply the eluent to automatic sampler 13 at a constant flow rate.

Automatic sampler 13 injects a sample liquid into the eluent at predetermined timing. Accordingly, the sample is introduced together with the eluent into a column (not illustrated) installed in column oven 14. Automatic sampler 13 includes a cooler (not illustrated), and the cooler adjusts temperature in automatic sampler 13.

Column oven 14 has a function of warming the column to a desired temperature. Column oven 14 separates and elutes the components in the liquid passing through the column using a property that the time (retention time) for passing through the column is different for each component.

Detector 15 sequentially detects a light intensity signal indicating an absorbance spectrum of a predetermined wavelength range corresponding to a sample component eluted in column oven 14. Detector 15 converts the light intensity signal into digital data (detection data). Detector 15 further transmits the detection data for each retention time to workstation 3 through system controller 2.

Workstation 3 generates a three-dimensional chromatogram based on the detection data, and executes qualitative analysis and quantitative analysis of the components in the sample using the generated three-dimensional chromatogram. Furthermore, workstation 3 displays an analysis result on a display 32 (described later).

Figure 2:
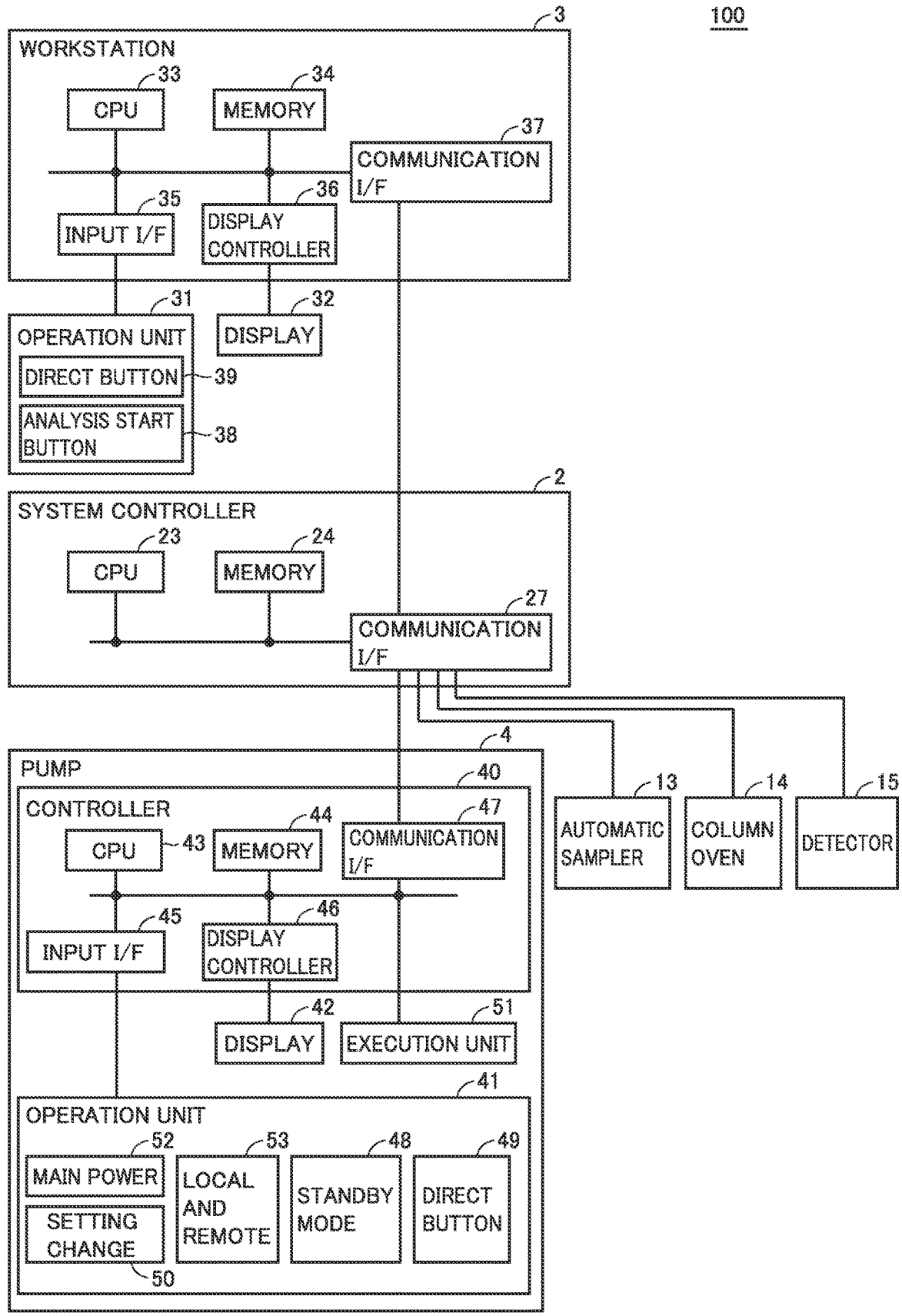
FIG. 2 is a view schematically illustrating configurations of a workstation, a system controller, and a unit.

FIG. 2 is a view schematically illustrating configurations of workstation 3 and analyzer 1.

(Description of Workstation)

Referring to FIG. 2, workstation 3 includes a CPU 33, a memory 34, an input interface (hereinafter, also referred to as an input I/F) 35, a display controller 36, and a communication interface (hereinafter, also referred to as a communication I/F) 37. The devices of workstation 3 are connected to each other by a common system bus, and are configured to be able to transmit and receive signals to and from each other through the system bus.

Workstation 3 is configured to operate according to a program stored in memory 34. Memory 34 includes a read only memory (ROM), a random access memory (RAM), and a hard disk drive (HDD) (not illustrated).

The ROM can store a program executed by CPU 33. The program includes a program related to the control of analyzer 1 and a program related to arithmetic processing of data obtained by analyzer 1. The RAM can temporarily store data used during the execution of the program in CPU 33 and function as a temporary data memory used as a work area. The HDD is a nonvolatile storage device, and can store the data received from system controller 2, the data subjected to the arithmetic processing, and the like. A semiconductor storage device such as a flash memory may be adopted in addition to the HDD or instead of the HDD.

CPU 33 loads the program stored in the ROM of memory 34 into the RAM or the like and executes the program.

Input I/F 35 is connected to operation unit 31 in the wired or wireless manner.

Input I/F 35 is an interface through which workstation 3 communicates with operation unit 31, and receives various signals from operation unit 31.

Operation unit 31 is an operation device used to remotely operate each unit from workstation 3. For example, operation unit 31 is a pointing device such as a keyboard and a mouse. Typically, various commands can be input to workstation 3 by selecting a button on an operation screen displayed on display 32 using operation unit 31 (see FIG. 3). When display 32 (described later) is a touch panel, display 32 and operation unit 31 are integrated. Operation unit 31 includes a direct button 39 and an analysis start button 38.

Direct button 39 is a button used to remotely operate start (ON) and stop (OFF) of each unit from workstation 3. A start signal is output from workstation 3 to the corresponding unit by selecting "ON" for the target unit on direct button 39. Direct button 39 is used for preparation operation (warm-up operation) of each unit prior to the actual analysis. Specifically, when direct button 39 is turned on, the execution unit of each unit is started to start the warm-up operation. The execution unit is a unit that actually executes a function of a unit, and corresponds to an embodiment of the "execution device". When the execution unit of each unit is simply referred to as an "execution unit", the execution unit indicates the execution unit of each unit. The start, operation, and stop of the execution unit of each unit are also simply referred to as start, operation, and stop of each unit. By executing the warm-up operation of the unit, the function of each unit can be brought into a state suitable for the analysis. For example, in pump unit 4, the rotation speed of the pump can be stabilized by the warm-up operation, and a stable discharge flow rate can be secured. In column oven 14, an inside temperature can be raised to a predetermined temperature suitable for the analysis. Detector 15 stabilizes a light amount of a light source, and executes temperature control to raise the inside of detector 15 to a predetermined temperature by a heater.

Analysis start button 38 is a button used to start the analysis of the sample. Normally, the user operates analysis start button 38 in the state where the warm-up operation is completed to satisfy a desired analysis condition. As a result, an analysis start command is output from workstation 3, a unit used for the analysis executes predetermined operation, and the analysis is started. When the analysis start command is output, the unit used for analysis is forcibly started when the unit is stopped.

Display controller 36 is connected to display 32 in the wired or wireless manner. Display controller 36 outputs a signal instructing a display content to display 32 according to a command from CPU 33. When display 32 is a touch panel, input I/F 35 receives a signal indicating a touch operation of an analyst from the touch panel. Display 32 provides information related to the control of analyzer 1, the analysis result by analyzer 1, and the like to the analyst.

Communication I/F 37 is connected to communication I/F 27 of system controller 2. Communication I/F 37 is an interface through which workstation 3 communicates with system controller 2, and inputs and outputs various signals to and from system controller 2.

(Description of System Controller)

System controller 2 includes a CPU 23, a memory 24, and communication I/F 27. System controller 2 is configured to operate according to a program stored in the memory 24. Memory 24 includes a ROM, a RAM, and an HDD (not illustrated). The devices of system controller 2 are connected to each other by a common system bus, and are configured to be able to transmit and receive signals to and from each other through the system bus.

CPU 23 loads the program stored in the ROM of memory 24 into the RAM or the like and executes the program.

Communication I/F 27 is connected to communication I/F 37 of workstation 3 and the communication I/F of each unit. Communication I/F 27 is an interface through which system controller 2 communicates with workstation 3 and each unit, and communication I/F 27 transmits and receives various signals to and from workstation 3 and each unit.

(Description of Unit)

A configuration of the unit will be described with pump unit 4 as an example.

Pump unit 4 includes a controller 40, an operation unit 41, a display 42, and a pump 51. Pump 51 corresponds to an embodiment of the "execution device", and hereinafter, sometimes also be referred to as an "execution unit 51".

Controller 40 includes a CPU 43, a memory 44, an input I/F 45, a display controller 46, and a communication I/F 47. Pump unit 4 executes operation related to the analysis according to a program stored in memory 44 and instructions from workstation 3 and system controller 2. Memory 44 includes a ROM, a RAM, and an HDD (not illustrated). The devices of controller 40 are connected to each other by a common system bus, and are configured to be able to transmit and receive signals to and from each other through the system bus.

The CPU 43 loads the program stored in the ROM of memory 44 into the RAM or the like and executes the program.

Input I/F 45 is connected to operation unit 41 in the wired or wireless manner. Input I/F 45 is an interface through which pump unit 4 communicates with operation unit 41, and receives various signals from operation unit 41.

Display controller 46 is connected to display 42 in the wired or wireless manner. Display controller 46 outputs a signal instructing a display content to display 42 according to a command from CPU 43. When display 42 includes a touch panel, display controller 46 receives the signal indicating the touch operation of the analyst from display 42.

Communication I/F 47 is connected to communication I/F 27 of system controller 2. Communication I/F 47 is an interface through which pump unit 4 communicates with system controller 2, and inputs and outputs various signals to and from system controller 2.

Operation unit 41 is an operation device used to operate each unit individually. Operation unit 41 is used to operate various power supplies and change a setting of a parameter. Operation unit 41 is provided in a unit body or in a vicinity of the unit.

Operation unit 41 is typically constructed with a touch panel, a switch, a button, and the like. For example, operation unit 41 includes a main power button 52, a local and remote switching button 53, a standby mode selection button 48, a direct button 49, and a setting change button 50.

Main power button 52 is a button used to switch ON and OFF of power supply to entire pump unit 4. When main power button 52 is ON, the power is supplied to devices (controller 40, operation unit 41, display 42, and execution unit 51) included in pump unit 4. On the other hand, when main power button 52 is OFF, the power to the devices included in pump unit 4 is cut off. Accordingly, when main power button 52 is OFF, pump unit 4 does not receive any input from the outside (for example, the input from system controller 2 and the input from a button other than main power button 52 of operation unit 41), and does not operate at all.

Local and remote switching button 53 is a button that switches between a local mode and a remote mode. The local mode is a mode that operates according to the input from operation unit 41. The local mode is used when pump 51 is started on site at the time of maintenance, test operation, or the like of pump unit 4, or when various settings are changed on site. On the other hand, the remote mode is a mode in which pump unit 4 operates according to the signal from workstation 3 based on the operation of operation unit 31 by the analyst. When the sample analysis is executed, the remote mode is used.

Standby mode selection button 48 is a button used to select a mode (hereinafter, referred to as a "standby mode") in which the power supplied to execution unit 51 is stopped to supply only the control power. That is, only controller 40, operation unit 41, and display 42 are enabled in the standby mode. Accordingly, in the standby mode, pump unit 4 can communicate with system controller 2 and workstation 3, but cannot drive execution unit 51. For example, the standby mode is used to reduce power consumption when the analysis is not executed.

Direct button 49 is a button that switches between the start (ON) and the stop (OFF) of pump (execution unit) 51. Direct button 49 has the same function as direct button 39 provided on operation unit 31 that communicates with workstation 3. That is, the analyst can switch the start and the stop of pump 51 using operation unit 31 of the workstation or operation unit 41 of the unit. The states of the direct buttons on operation unit 31 and operation unit 41 are displayed in conjunction with each other. "ON" is displayed when pump 51 is in operation, and "OFF" is displayed when pump 51 is stopped. For example, direct button 49 is used in temporarily stopping pump 51 when the component of the unit is replaced during the warm-up operation before the start of the analysis.

Setting change button 50 is a button that changes the settings of various parameters and the like of the unit. For example, pump unit 4 is used to change setting values such as a flow rate and a pressure.

In FIG. 2, the configuration of pump unit 4 has been described as the example of the unit. However, in automatic sampler 13, column oven 14, and detector 15, which are other units, the content of the operation is different from each other, but are controlled similarly to pump unit 4.

FIGS. 1 and 2 show each unit (that is, pump unit 4, automatic sampler 13, column oven 14, and detector 15) as a single unit. However, the present invention is not limited to the example illustrated in FIGS. 1 and 2, and the number of units may be plural. For example, when two column ovens 14 are provided, one column oven 14 may be warmed to prepare for the next analysis while the other column oven 14 is used for the analysis. When a plurality of pump units 4 are provided, the sample can be injected into one column oven using a plurality of pumps. Furthermore, other types of units not illustrated in FIGS. 1 and 2 can be used. As described above, for each of the plurality of types of units, one or the plurality of units are connected to system controller 2, so that the units can appropriately be used according to the situation, which is highly convenient.

Direct button 49 of operation unit 41 having such a configuration is used to stop individual units for maintenance or the like after each unit is remotely started from workstation 3 in executing the warm-up operation for the preparation of the analysis. For example, a situation in which the column of column oven 14 is replaced during the warm-up operation of column oven 14 is considered. In such a situation, the operator (for example, the analyst or a third party) first turns off direct button 49 of pump unit 4 to stop the inflow of the sample into column oven 14. Then, the operator turns off the direct button of column oven 14 to stop heating of column oven 14, and replaces the column in column oven 14. When the column replacement is completed, the operator turns on the direct button of each of pump unit 4 and column oven 14 to restart the warm-up operation.

However, after the column replacement is completed, the operator may fail to operate the switch of the direct button of at least one of pump unit 4 and column oven 14, and may forget a restart. In such a case, there is a possibility that the analyst selects analysis start button 38 at workstation 3 to start the analysis without noticing that some units are in the stopped state. In such a case, the stopped unit is also started by the operation of analysis start button 38, and the analysis is started. At this point, for the unit in which the warm-up operation is interrupted due to forgetting to restart, the analysis may be started in the state where the state of each unit and the analysis condition (operation state, setting value, and the like) are not matched with each other. For example, in the case of pump unit 4, the flow rate immediately after the start is not stable. In the case of column oven 14, there is a possibility that the internal temperature does not reach the set temperature (for example, 50° C.). Consequently, in such a situation, there is a risk that the analysis cannot correctly be executed.

Similarly, for automatic sampler 13, a cooler is stopped when the restart after the temporary stop is forgotten, so that the temperature of automatic sampler 13 may not be maintained at the predetermined temperature. Furthermore, in the case of detector 15, when a light source such as a photodiode or a deuterium lamp remains turned off, there is a possibility that luminance (light amount) of the light source immediately after activation becomes unstable. In addition, when the heater is turned off in detector 15 and temperature control is not executed, a background noise increases immediately after the start, and analysis reproducibility is degraded.

For this reason, analysis system 100 of the embodiment is configured to determine whether the state of the unit used for the analysis is matched with the analysis condition set by the workstation to notify the analyst of the determination result. Consequently, the possibility that the analyst starts the analysis without noticing that the state of each unit and the analysis condition are not matched with each other to execute unintentionally improper analysis can be decreased.

Figure 3:
FIG. 3 is a view illustrating a display example of control software on a display.

FIG. 3 is a view illustrating a display example on display 32. FIG. 3 illustrates an example in which a method file, a direct button 39, a unit status, a total status, and an analysis start button 38 are displayed.

In the method file, the analysis condition that is a condition during the analysis (start) is set for each unit connected to system controller 2. The analysis condition includes the setting of whether each unit is used for the analysis. The method file can be previously set by the user. For example, in the example of FIG. 3, because pump unit 4, automatic sampler 13, column oven 14, and detector 15 are used for the analysis, the display corresponding to these units is displayed as "used". Here, when another unit (for example, a second column oven) is connected to system controller 2 and the unit is not used for the analysis, "not used" is displayed for the another unit.

As an example of another analysis condition, the setting condition of each unit can be set in the method file. For example, in the example of FIG. 3, setting values of physical or chemical states such as the flow rate of pump unit 4, the temperature of automatic sampler 13, and the temperature of column oven 14 are set.

As described above, direct button 39 is a button used to remotely start or stop each unit from operation unit 31. In each unit, when local and remote switching button 53 is selected as "remote", the start and stop of each unit can be switched by the operating of direct button 39. Direct button 39 also indicates the start and stop state of each unit.

The unit status displays a result of determination whether the state of the unit designated to be used is matched with the analysis condition set by the method file. Specifically, "ready" is displayed when the state of each unit and the analysis condition are matched with each other, and "not ready" is displayed when the state of each unit and the analysis condition are not matched with each other. In other words, the unit status is a status indicating whether each unit is in a state in which the analysis can appropriately be started.

FIG. 4 is a table illustrating a unit status determination method of the first embodiment. Referring to FIG. 4, in the first embodiment, the case where the determination of the unit status is executed in each unit will be described as an example, but the determination may be executed in workstation 3 or system controller 2. The CPU of each unit compares the used or not used information about the unit in the method file with the operation state of the unit (display of ON or OFF of the direct button) (comparison 1). The CPU of each unit sets the unit status to "ready" when the used or not used information about the unit in the method file is matched with the operation state of the unit, and the CPU of each unit sets the unit status to "not ready" when the used or not used information about the unit in the method file is not matched with the operation state of the unit.

Specifically, as in the case 1-2, in the unit designated to be used for the analysis by the method file, the unit status is "ready" when the unit is in the start state (that is, the state of the direct button is ON). On the other hand, as in Case 1-1, when the unit is designated to be used for the analysis but the unit is currently stopped (the state of the direct button is OFF), the unit status is "not ready" because the appropriate analysis cannot be started.

The result of the determination of ready or not ready by the CPU of each unit is transmitted to workstation 3 through the communication I/F of the unit and system controller 2. Workstation 3 displays the determination result on display 32.

In the case 1-0, the unit status is not determined because the unit is not used for the analysis. In the example of the first embodiment, the CPU of each unit corresponds to an embodiment of the "determination device". The CPU of each unit and workstation 3 thus correspond to an embodiment of the "control device". In the first embodiment, the functions as the "setting device" and the "determination device" are executed by workstation 3 and the CPU of each unit, but a device in charge of each function is not limited to workstation 3 and the CPU of each unit. For example, both the functions as the "setting device" and the "determination device" may be configured to be executed by any one of workstation 3, system controller 2, and the CPU of each unit.

Referring again to FIG. 3, the total status is an index indicating whether entire analyzer 1 is in a state in which the appropriate analysis can be started. It is determined as the total status as "ready" when all the unit statuses of the units designated to be used by the method file are "ready", and it is determined as the total status as "not ready" when even one unit status is "not ready". That is, the total status is obtained by taking a logical product (AND) of the unit statuses. Thus, the analyst can confirm whether the state of any unit is matched with the analysis condition by the total status. Accordingly, the possibility that inappropriate analysis is started can be reduced.

As described above, analysis start button 38 is a button used to instruct the start of the actual analysis. When analysis start button 38 is operated with the total status as "ready", the analysis is immediately started. On the other hand, when analysis start button 38 is operated with the total status as "not ready", the analysis is not started, and a warning indicating that the total status is "not ready" (that is, any unit in which use is designated in the method file is stopped) is displayed on display 32. At this point, in display 32, the analyst may be notified of the specific state of the unit that is in the state of "not ready". That is, display 32 corresponds to an example of the "notification device". In the first embodiment, display 32 is exemplified as the notification device. However, the present invention is not limited to display 32 as long as the unit is capable of notifying and warning the analyst, and for example, a voice output unit that executes the notification and the warning by voice may be used.

As described above, the analyst can notice that any unit is not in the state of being able to appropriately start the analysis before the start of the analysis, and can prevent the start of the analysis in the inappropriate state.

When the total status is "not ready", analysis start button 38 is interlocked such that the analysis operation is not started even when analysis start button 38 is operated, so that the analysis can certainly be prohibited from being started in the inappropriate state.

On the other hand, for example, for the test operation of the analysis operation or the like, there may be the case where it is desired to forcibly start the analysis even when it is not in the state suitable for the analysis. For this reason, when any one of the units is "not ready", the analyst may arbitrarily select whether to cancel the start of the analysis or execute the analysis instead of prohibiting the start of the analysis.

Figure 5:
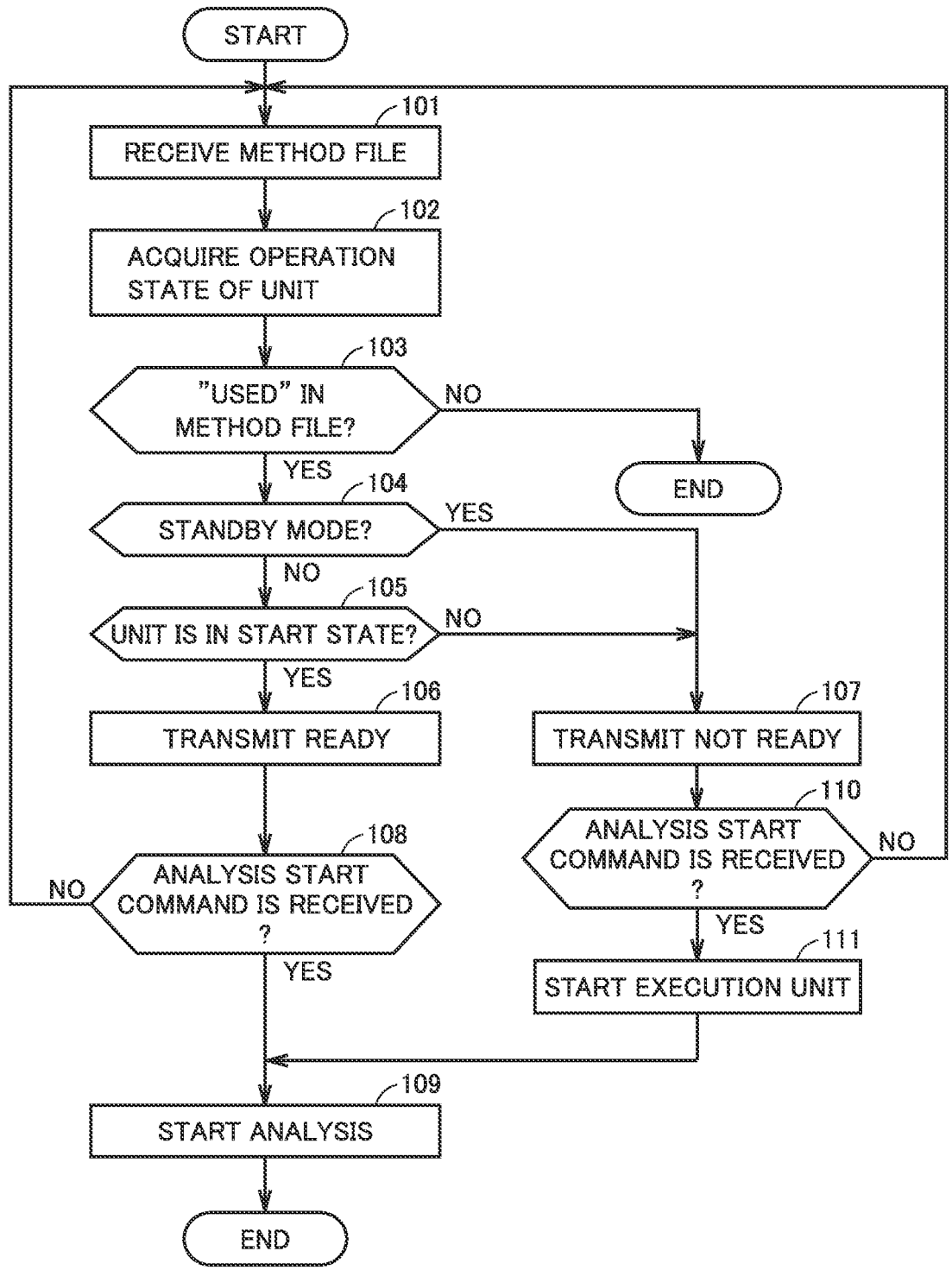
FIG. 5 is a flowchart illustrating processing of a controller of the unit of the first embodiment.

FIG. 5 is a flowchart illustrating processing executed by the controller of each unit in analysis system 100 of the first embodiment. The flowchart in FIG. 5 is repeatedly executed in the controller of each unit at predetermined control intervals.

Referring to FIG. 5, in step 101, the controller receives the method file from workstation 3. In step 102, the controller acquires the operation state (that is, the ON and OFF state of the direct button) of the unit.

In step 103, the controller determines whether the use of the unit is designated in the method file. When the use of the unit is not designated in the method file (NO in step 103), the unit is not used for the analysis, and thus the controller skips the subsequent processing and ends the processing.

When the use of the unit is designated in the method file (YES in step 103), the processing proceeds to step 104, and the controller determines whether the unit is in the standby mode. When the unit is not in the standby mode (NO in step 104), the processing proceeds to step 105, and the controller determines whether the unit is in the start state. When the unit is in the start state (YES in step 105), the processing proceeds to step 106, and the controller transmits information indicating that the state of the unit is "ready" to system controller 2, and the processing proceeds to step 108.

In step 108, the controller determines whether the analysis start command has been received. When the analysis start command is not received (NO in step 108), the controller returns the processing to step 101. On the other hand, when the analysis start command is received (YES in step 108), the analysis is started using the unit in step 109.

When the unit is in the standby mode (YES in step 104) or when the unit is not in the start state (NO in step 105), the processing proceeds to step 107, and the controller transmits information indicating that the state of the unit is "not ready" to system controller 2.

Subsequently, in step 110, the controller determines whether the analysis start command is received. When the analysis start command is not received (NO in step 110), the controller returns the processing to step 101. On the other hand, when the analysis start command is received (YES in step 110), the controller starts the execution unit in step 111, and starts the analysis using the unit in step 109.

Figure 6:
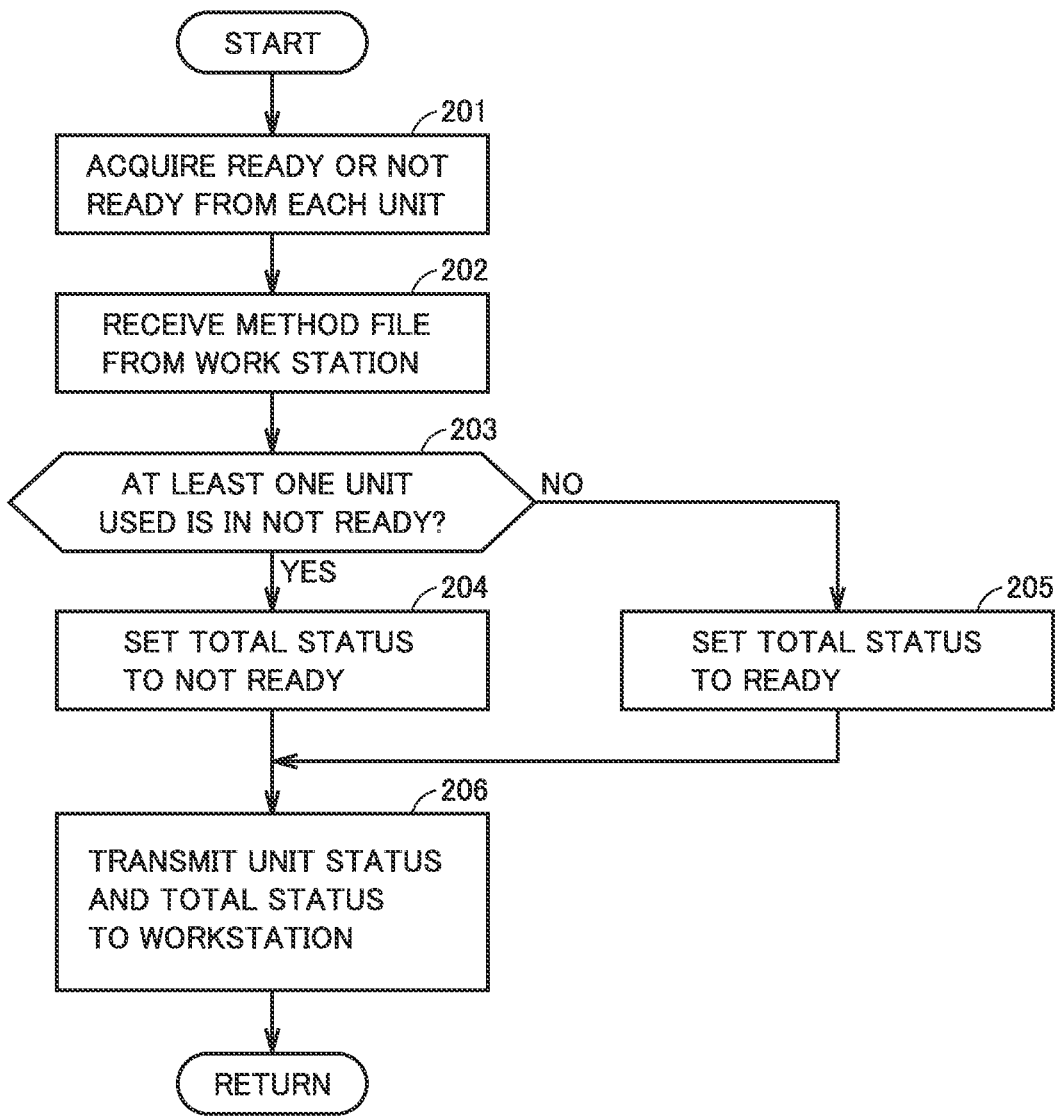
FIG. 6 is a flowchart illustrating processing of the system controller of the first embodiment.

FIG. 6 is a flowchart illustrating processing of system controller 2 in analysis system 100 of the first embodiment. The flowchart in FIG. 6 is repeatedly executed by CPU 23 of system controller 2 at predetermined control intervals.

Referring to FIG. 6, in step 201, CPU 23 acquires a signal indicating ready or not ready from each unit connected to system controller 2. In step 202, CPU 23 receives the method file from workstation 3. The method file includes the setting of which unit is used for the analysis among the units connected to system controller 2.

In step 203, CPU 23 determines whether at least one unit in the state of "not ready" exists among the units used for the analysis based on the signal indicating ready or not ready from each unit and the information about the method file. When at least one of the units used for the analysis is in the state of "not ready" (YES in step 203), the total status is set to "not ready" in step 204, and the processing proceeds to step 206. On the other hand, when the states of all the units used for analysis are "ready" (NO in step 203), the total status is set to "ready" in step 205, and the processing proceeds to step 206.

In step 206, CPU 23 transmits the unit status and the total status to workstation 3.

Figure 7:
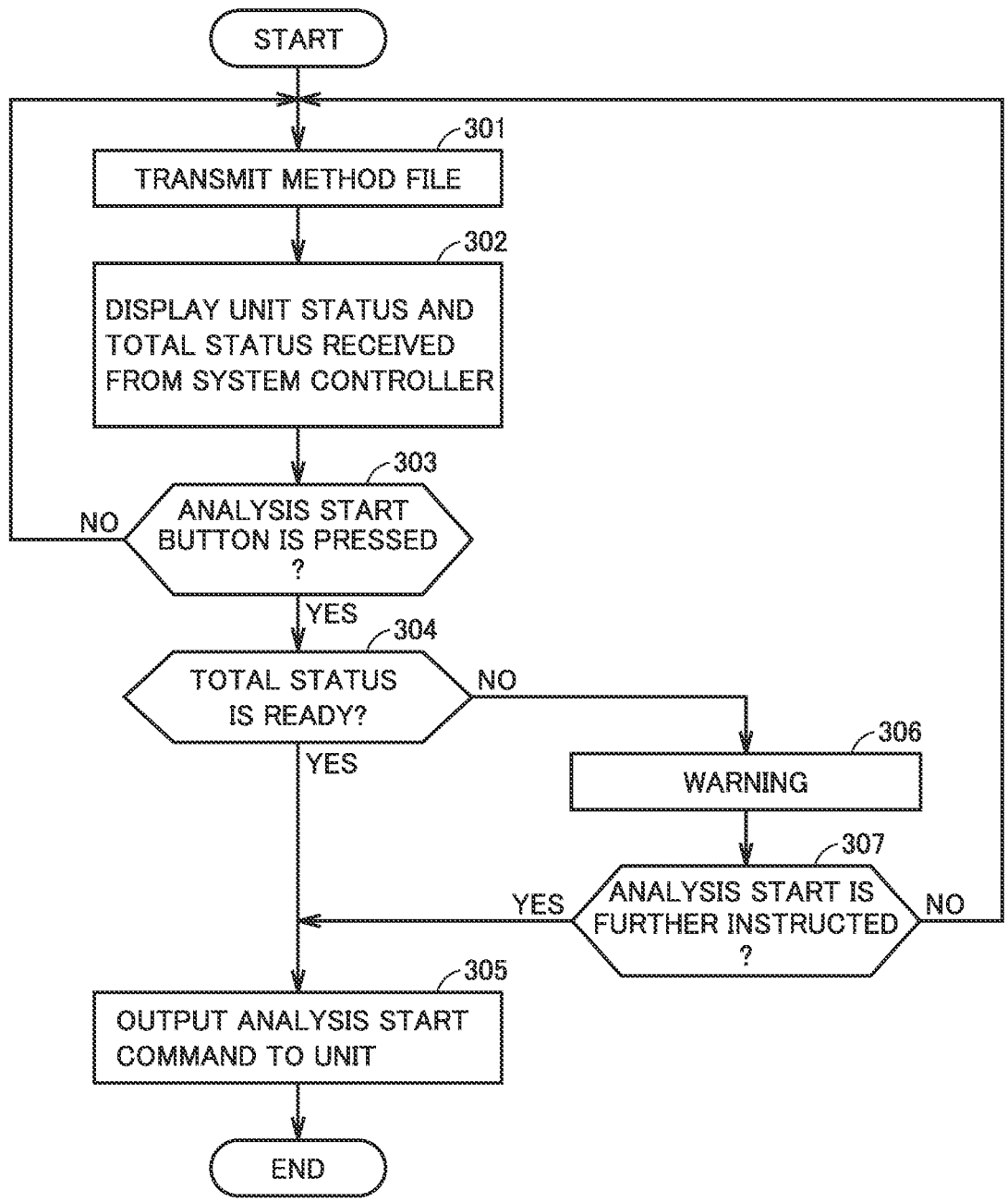
FIG. 7 is a flowchart illustrating processing of the workstation of the first embodiment.

FIG. 7 is a flowchart illustrating processing of workstation 3 in analysis system 100 of the first embodiment. The flowchart in FIG. 7 is repeatedly executed by CPU 33 of the workstation at predetermined control intervals.

Referring to FIG. 7, in step 301, CPU 33 transmits the method file to system controller 2 and each unit. In step 302, CPU 33 displays the unit status and the total status received from system controller 2 on display 32.

In step 303, CPU 33 determines whether analysis start button 38 is pressed. When analysis start button 38 is not pressed (NO in step 303), CPU 33 returns the processing to step 301.

When analysis start button 38 is pressed (YES in step 303), CPU 33 determines whether the total status is "ready" in step 304. When the total status is "ready" (YES in step 304), CPU 33 outputs the analysis start command to the unit designated by the method file.

On the other hand, when the total status is "not ready" (NO in step 304), in step 306, CPU 33 displays the warning indicating that the total status is "not ready" on display 32. In step 307, after giving the warning, CPU 33 determines whether the start of the analysis is further instructed. The instruction to start the analysis is executed by operating the confirmation button in the warning display or by re-operating analysis start button 38.

When the start of the analysis is instructed (YES in step 307), CPU 33 advances the processing to step 305 and outputs the analysis start command to each unit. On the other hand, when the start of the analysis is not instructed (NO in step 307), CPU 33 ends the processing.

By executing the processing in the flowcharts of FIGS. 5 to 7 by each unit, system controller 2, and workstation 3, in the first embodiment, it is determined whether the unit designated by the method file is started (during the warm-up operation), and the analyst is notified whether the analysis of entire analyzer 1 can be started. Thus, it is possible to reduce the possibility that the analyst starts the analysis without noticing the state in which the analysis is not ready and inappropriate analysis is executed.

Second Embodiment

In the first embodiment, the configuration of determining whether each unit is in the "ready" state based on the fact that each unit is started has been described. However, even when each unit is in the operation, there may be a case where each unit is not in the state suitable for the start of the analysis by itself. For example, for the column oven, even during operation, when the analysis is started while the internal temperature does not reach a predetermined temperature, there is the case where the appropriate analysis cannot be executed.

In a second embodiment, a configuration for determining whether each unit is in the "ready" state in consideration of whether the setting condition for the unit is satisfied in addition to that each unit is in operation will be described.

FIG. 8 is a table illustrating a unit status determination method in analysis system 100 of the second embodiment. Referring to FIG. 8, in the second embodiment, similarly to the first embodiment, when the state of the direct button is OFF (that is, the unit is stopped) in the unit designated to be used for the analysis in the method file, it is determined that the used or not used information about the unit in the method file is not matched with the operation state of the unit, and the unit status is set to "not ready" (comparison 1). Furthermore, when it is determined that the setting condition of the method file is not satisfied even when the state of the direct button is ON (that is, the unit is started) in the unit designated to be used for the analysis in the method file, the unit status is set to "not ready" because there is no state where the appropriate analysis can be executed (comparison 2).

Specifically, as in case 2-3, in the unit designated to be used for the analysis in the method file, when the state of the direct button is ON and when the setting condition of the method file is matched with the measurement value measured by the unit for the corresponding item, the unit status is "ready". On the other hand, as in case 2-2, in the unit designated to be used for the analysis in the method file, the unit status becomes "not ready" when the setting condition of the method file is not satisfied even when the state of the direct button is ON.

For example, when the setting condition of the method file is set to 50° C. in column oven 14, the unit status is "not ready" when the actual temperature in column oven 14 is 25° C. even when column oven 14 is started. Such a configuration reduces the possibility that the analysis is started while the analyst does not notice that the setting condition of the method file is unsatisfied.

Figure 9:
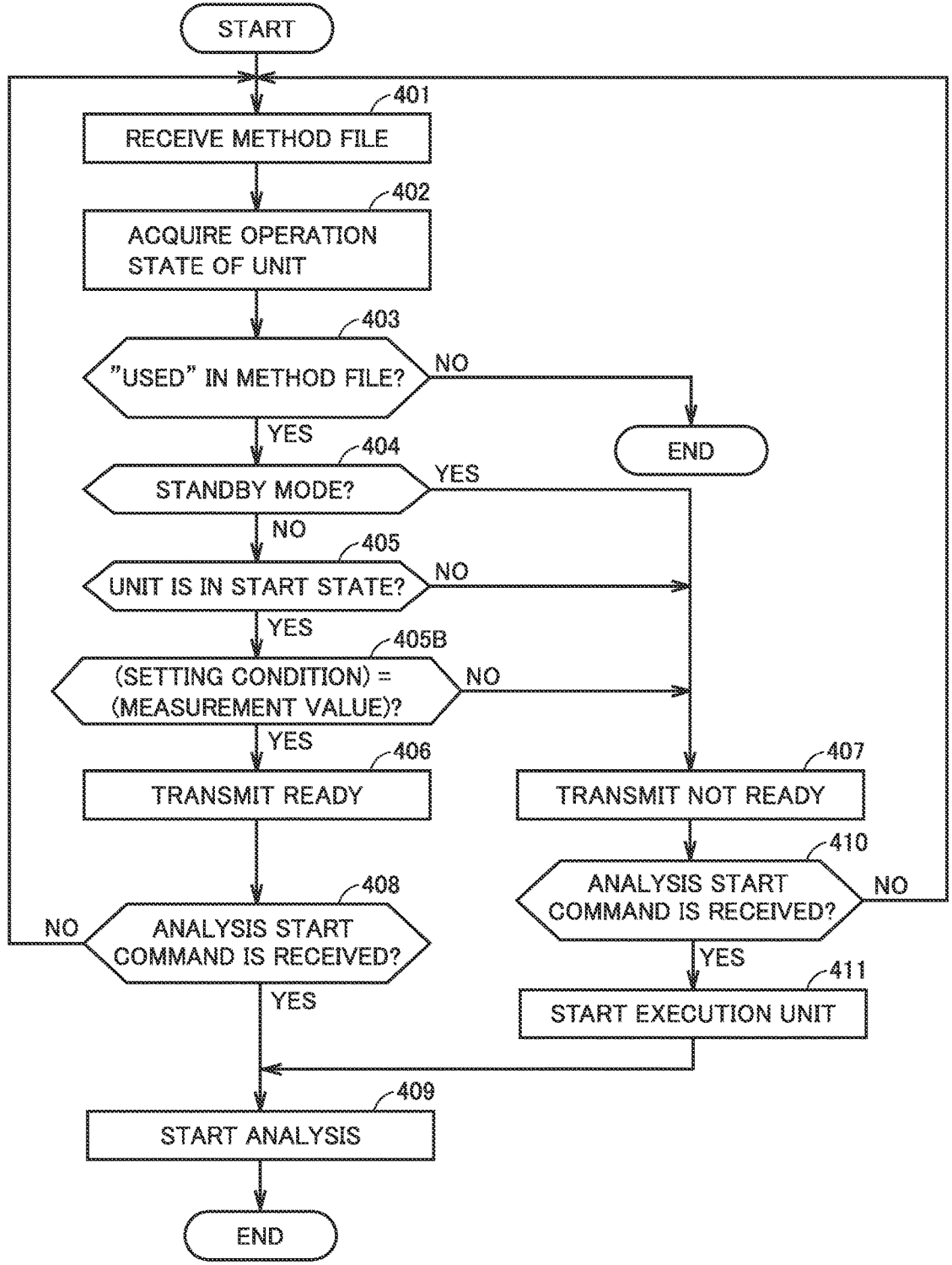
FIG. 9 is a flowchart illustrating processing of a controller of a unit of the second embodiment.

FIG. 9 is a flowchart illustrating processing of the controller of each unit in analysis system 100 of the second embodiment. The flowchart in FIG. 9 is repeatedly executed at predetermined control intervals in the controller of each unit.

FIG. 9 is a view corresponding to FIG. 5, and steps 401 to 405 in FIG. 9 correspond to step 101 to step 105. Steps 406 to 411 in FIG. 9 correspond to steps 106 to 111. Consequently, in FIG. 9, step 405B different from FIG. 5 will mainly be described, and other descriptions will not be repeated.

When the unit designated in step 405 is in the start state (YES in step 405), in step 405B, the controller of the unit determines whether the setting condition of the method file is matched with the measurement value in the unit for the item corresponding to the setting condition. When the setting condition of the method file is matched with the measurement value in the unit (YES in step 405B), the processing proceeds to step 406, and the controller transmits the information indicating that the state of the unit is "ready" to system controller 2, and the processing proceeds to step 408.

In step 408, the controller determines whether the analysis start command is received. When the analysis start command is not received (NO in step 408), the controller returns the processing to step 401. On the other hand, when the analysis start command is received (YES in step 408), the analysis is started in step 409, and the processing is ended.

On the other hand, when the setting condition of the method file and the measurement value in the unit is not matched with each other (NO in step 405B), the processing proceeds to step 407, and the controller transmits the information indicating that the state of the unit is "not ready" to system controller 2.

Subsequently, in step 410, the controller determines whether the analysis start command is received. When the analysis start command is not received (NO in step 410), the controller returns the processing to step 401. On the other hand, when the analysis start command is received (YES in step 410), the controller starts the execution unit in step 411, and starts the analysis using the unit in step 409.

The processing of system controller 2 and workstation 3 in the second embodiment is similar to that in the first embodiment. Accordingly, when analysis start button 38 is pressed while the total status is not ready, display 32 warns that the total status is not ready. At this point, the unit that is not ready, the cause of not ready, and the information accompanying the cause (for example, the setting condition of the method file is different from the measurement value of the unit, and the content of the setting condition and the measurement value) may be displayed.

In this way, in the second embodiment, it is determined whether the measurement values of the unit is matched with the measurement conditions designated by the method file, namely, whether the analysis can be started, and the analyst is notified of the result of the determination. Furthermore, when the unit designated for use at the start of the analysis is not ready, a warning is output to the analyst.

That is, in the first and second embodiments, it is determined whether the state (ON/and OFF of the direct button, the measurement value of the unit, and the like) of the unit is matched with the analysis condition (the use and non-use of the unit, the physical setting condition, and the like) set by workstation 3, and display 32 notifies the analyst of the determination result.

Consequently, the analysis system that reduces the possibility of the inappropriate analysis in the analysis system in which the analysis unit including the plurality of units is controlled by a computer can be provided.

[Aspects]

It is understood by those skilled in the art that the plurality of exemplary embodiments described above are specific examples of the following aspects.

(Item 1)

An analysis system according to one aspect is analysis system that analyzes a sample by combining functions of a plurality of units, the analysis system includes: a setting device that sets an analysis condition for each of the plurality of units; an execution device that executes the function of each of the plurality of units prior to the analysis of the sample; a determination device that determines whether preparation for starting the analysis is completed for each of the plurality of units based on a comparison between a state of the unit and the analysis condition corresponding to the unit; and a notification device that notifies an analyst of a determination result by the determination device.

According to the analysis system described in item 1, the possibility that the analysis is executed under the inappropriate analysis condition can be reduced in the analysis system in which the analyzer including the plurality of units is controlled by the computer.

(Item 2)

According to the analysis system described in item 1, the determination device determines whether the preparation for starting the analysis is completed in all of the plurality of units, and the notification device notifies the analyst of the determination result.

(Item 3)

According to the analysis system described in item 1 or 2, when the start of the analysis is commanded while the determination device determines that the preparation for starting the analysis is not completed for any of the plurality of units, the notification device outputs a warning before the analysis is started.

(Item 4)

According to the analysis system described in any one of items 1 to 3, the analysis condition includes a setting of whether each of the plurality of units is used for the analysis, and the determination device determines whether the preparation for starting the analysis is completed for each of the plurality of units based on a comparison between a state of the execution device and the analysis condition.

(Item 5)

According to the analysis system described in any one of items 1 to 4, the analysis condition includes a setting value for a physical or chemical state in each of the plurality of units, and the determination device determines whether the preparation for starting the analysis is completed for each of the plurality of units based on a comparison between a measurement value of the physical or chemical state of the unit and the setting value.

(Item 6)

The analysis system described in any one of items 1 to 5, includes the plurality of units and a control device, wherein the control device includes the setting device and the determination device.

(Item 7)

According to the analysis system described in any one of items 1 to 6, the analysis system is a liquid chromatograph analysis system, and the plurality of units includes a pump, an automatic sampler, a column oven, and a detector.

It should be considered that the disclosed embodiments are an example in all respects and not restrictive. The scope of the present invention is defined by not the description above, but the claims, and it is intended that all modifications within the meaning and scope of the claims and their equivalents are included in the present invention.

REFERENCE SIGNS LIST

1: analyzer; 2: system controller; 3: workstation; 4: pump unit; 11: eluent tank; 13: automatic sampler; 14: column oven; 15: detector; 32, 42: display; 24, 34, 44: memory; 31, 41: operation unit; 36, 46: display controller; 38: analysis start button; 40: controller; 52: main power button; 53: local and remote switching button; 48: standby mode selection button; 50: setting change button; 51: pump (execution unit); 100: analysis system; 39, 49: direct button; 35, 45: input interface (input I/F); 27, 37, 47: communication interface (communication I/F).

The invention claimed is:

1. An analysis system that analyzes a sample by combining functions of a plurality of units and a control device, each of the plurality of units being configured to execute operation according to an analysis condition, the control device being configured to remotely operate the plurality of units, the analysis condition including a value of a parameter set for each of the plurality of units, the analysis system comprising:

the control device including a computer processor configured to receive the value of parameter for each of the plurality of units and output the corresponding analysis condition to each of the plurality of units;

each of at least one of the plurality of units including a computer processor configured to:

receive the analysis condition output from the control device;

change the value of a parameter by an operation circuitry operable by a user, the operation circuitry being provided in a unit body;

apply the value of parameter before the analysis of the sample by executing the function of each of the at least one of the plurality of units;

wherein the computer processor of the control device is further configured to:

determine whether preparation for starting the analysis is completed for each of the plurality of units by comparing a state of the unit to the value of parameter included in the analysis condition applied to the unit; and output a notification indicating whether preparation for starting the analysis is completed for each of the plurality of units.

2. The analysis system according to claim 1, wherein the computer processor of the control device:

determines whether the preparation for starting the analysis is completed in all of the plurality units, and notifies an analyst of the determination result.

3. The analysis system according to claim 1, wherein when the start of the analysis is commanded while the computer processor of the control device determines that the preparation for starting the analysis is not completed for any of the plurality of units, the computer processor of the control device outputs a warning before the analysis is started.

4. The analysis system according to claim 1, wherein the analysis condition includes a setting of whether each of the plurality of units is used for the analysis, and the computer processor of the control device determines whether the preparation for starting the analysis is completed for each of the plurality of units based on a comparison between a state of the execution device and the analysis condition.

5. The analysis system according to claim 1, wherein the analysis condition includes a setting value for a physical or chemical state in each of the plurality of units, and the computer processor of the control device determines whether the preparation for starting the analysis is completed for each of the plurality of units based on a comparison between a measurement value of the physical or chemical state of the unit and the setting value.

6. The analysis system according to claim 1, wherein the analysis system is a liquid chromatograph analysis system, and the plurality of units includes a pump, an automatic sampler, a column oven, and a detector.

7. An analysis system for analyzing a sample comprising:

a plurality of units, each of the plurality of units being configured to execute operation according to an analysis condition, wherein the analysis condition includes a value of a parameter set for each of the plurality of units; and a control device configured to remotely operate the plurality of units and including a computer processor configured to:

combine functions of the plurality of units to analyze a sample;

receive the value of parameter for each of the plurality of units; and output the corresponding analysis condition for each of the plurality of units, wherein each of at least one of the plurality of units includes a computer processor configured to:

receive the analysis condition output from the control device;

change the value of a parameter by an operation circuitry operable by a user, the operation circuitry being provided in a unit body;

apply the value of parameter before the analysis of the sample by executing the function of each of the at least one of the plurality of units;

wherein the computer processor of the control device is further configured to:

determine whether preparation for starting the analysis is completed for each of the plurality of units by comparing a state of the unit matching to the value of parameter included in the analysis condition applied to the unit; and output a notification indicating whether preparation for starting the analysis is completed for each of the plurality of units.

8. The analysis system according to claim 7, wherein the computer processor of the control device:

determines whether the preparation for starting the analysis is completed in all of the plurality of units, and the notifies an analyst of the determination result.

9. The analysis system according to claim 7, wherein when the start of the analysis is commanded while the computer processor of the control device determines that the preparation for starting the analysis is not completed for any of the plurality of units, the computer processor of the control device outputs a warning before the analysis is started.

10. The analysis system according to claim 7, wherein the analysis condition includes a setting of whether each of the plurality of units is used for the analysis, and the computer processor of the control device determines whether the preparation for starting the analysis is completed for each of the plurality of units based on a comparison between a state of the execution device and the analysis condition.

11. The analysis system according to claim 7, wherein the analysis condition includes a setting value for a physical or chemical state in each of the plurality of units, and the computer processor of the control device determines whether the preparation for starting the analysis is completed for each of the plurality of units based on a comparison between a measurement value of the physical or chemical state of the unit and the setting value.

12. The analysis system according to claim 7, wherein the analysis system is a liquid chromatograph analysis system, and the plurality of units includes a pump, an automatic sampler, a column oven, and a detector.

* * * * *